(12) United States Patent
Yoo et al.

(10) Patent No.: US 11,842,521 B1
(45) Date of Patent: Dec. 12, 2023

(54) SYSTEMS AND METHODS FOR COMPRESSING THREE-DIMENSIONAL IMAGE DATA

(71) Applicant: Illuscio, Inc., Culver City, CA (US)

(72) Inventors: Nolan Taeksang Yoo, Seattle, WA (US); Dwayne Elahie, Los Angeles, CA (US)

(73) Assignee: Illuscio, Inc., Culver City, CA (US)

(*) Notice: Subject to any disclaimer, the term of this patent is extended or adjusted under 35 U.S.C. 154(b) by 0 days.

(21) Appl. No.: 18/326,884

(22) Filed: May 31, 2023

(51) Int. Cl.
   *G06T 9/00* (2006.01)

(52) U.S. Cl.
   CPC .............. *G06T 9/001* (2013.01); *G06T 9/002* (2013.01)

(58) Field of Classification Search
   None
   See application file for complete search history.

(56) References Cited

U.S. PATENT DOCUMENTS

| 7,248,257 | B2 * | 7/2007 | Elber | G06T 17/30 |
| | | | | 382/241 |
| 11,733,853 | B1 * | 8/2023 | Harvill | G06F 3/1454 |
| | | | | 715/753 |
| 2007/0031003 | A1 * | 2/2007 | Cremers | G06V 10/755 |
| | | | | 382/173 |
| 2018/0197331 | A1 * | 7/2018 | Chen | G06T 19/20 |
| 2021/0027532 | A1 * | 1/2021 | Lin | G06T 17/05 |
| 2021/0090301 | A1 * | 3/2021 | Mammou | G06T 5/002 |
| 2023/0074979 | A1 * | 3/2023 | Brehmer | H04N 19/426 |

* cited by examiner

Primary Examiner — James A Thompson
(74) Attorney, Agent, or Firm — Ansari Katiraei LLP; Arman Katiraei; Sadiq Ansari

(57) ABSTRACT

Disclosed is a system and associated methods for compressing data in a three-dimensional ("3D") model. The system receives the constructs that form different shapes of a 3D object represented by the 3D model. The system selects a set of the constructs based on the set of constructs forming a particular shape that is compressible with a function. The system defines the function that generates an approximate shape for the particular shape formed by the set of constructs, and compresses the 3D model by replacing the set of constructs with the function. The system may tune the function so that the approximate shape matches the particular shape with more specificity, may define a noise pattern that approximates and applies the non-uniformity of the particular shape to the approximate shape, and may define a gradient pattern that approximates and applies the coloring of the set of constructs to the approximate shape.

22 Claims, 9 Drawing Sheets

SYSTEMS AND METHODS FOR COMPRESSING THREE-DIMENSIONAL IMAGE DATA

BACKGROUND

Three-dimensional ("3D") models may contain large amounts of data. Transferring the large amounts of data over a data network results in a degraded user experience because of the time associated with streaming or distributing so much data from one device to another. For instance, a point cloud may be defined with millions or billions of individual points that are distributed across a 3D space and that collectively form the shape of a 3D object. Each point is defined with positional data and/or color data. Such a point cloud may be hundreds of megabytes or gigabytes in size. Similarly, a high-resolution 3D mesh model may be defined with millions or billions of meshes. Each mesh is defined with positional data and color data, and may result in a file that is also hundreds of megabytes or gigabytes in size. The transfer of just one such 3D model over a data network may take several seconds or minutes. Consequently, it becomes impractical for different devices to collaborate on the design and development of 3D models or on the design and development of a 3D scene or environment that is constructed from multiple 3D models because of the significant delays incurred streaming the data of each model from one device to another device.

DETAILED DESCRIPTION OF PREFERRED EMBODIMENTS

The following detailed description refers to the accompanying drawings. The same reference numbers in different drawings may identify the same or similar elements.

Provided are systems and associated methods for compressing three-dimensional ("3D") image data. In particular, a compression system performs the compression by replacing the image data that is associated with different sets of constructs in a 3D model with functions, noise patterns, and/or gradient patterns. The functions, noise patterns, and/or gradient patterns recreate the shapes and coloring formed by the different sets of constructs with a high degree of accuracy and/or similarity without storing, transferring, or otherwise accessing the image data defined for each construct of the different sets of constructs.

Accordingly, the compression system generates a compressed 3D model that is defined with a first set of points, meshes, or other constructs that do not form shapes that may be represented with any functions, and one or more functions and/or noise patterns in place of a second set of constructs that form the shapes that may be accurately represented with one or more of the functions. In some embodiments, the first set of constructs may still be compressed using other compression techniques (e.g., Draco compression). In any case, the compressed 3D model has a smaller file size than the original uncompressed 3D model because the image data for each individual construct of the second set of constructs is replaced with a function, noise pattern, and/or gradient. Consequently, the compressed 3D model may be streamed from one device to another over a data network is less time than the original uncompressed 3D model.

The recipient device receiving the compressed 3D model may recreate the shape defined by the replaced second set of constructs with a high degree of accuracy based on the encoded function, noise pattern, and/or gradient pattern. In other words, the compression and decompression of the 3D image data may be lossy in that the second set of constructs may not be recreated at the same exact positions, with the same exact color values, or with the same quantity or distribution as in the original uncompressed 3D model. However, the defined function, noise pattern, and/or gradient pattern preserve and replicate the shape represented by the original second set of constructs in a manner that is unnoticeable or that does not materially affect the visualization of the 3D object represented by the 3D model.

Figure 1:
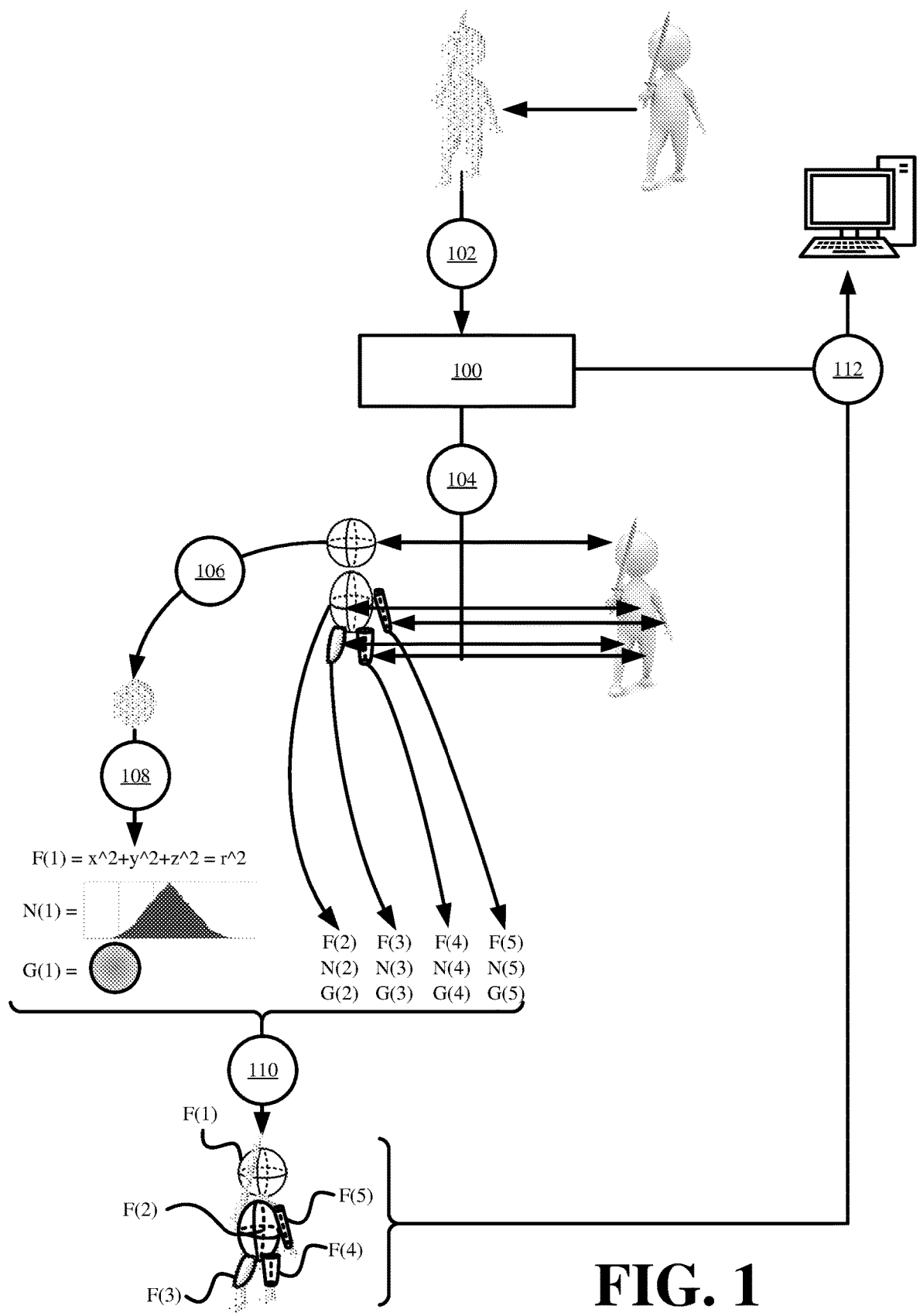
FIG. 1 illustrates an example of compressing shapes in a three-dimensional ("3D") model in accordance with some embodiments presented herein.

FIG. 1 illustrates an example of compressing shapes in a 3D model in accordance with some embodiments presented herein. Compression system 100 receives (at 102) a 3D model of one or more objects, scene, or environment. The 3D model may be defined with constructs of one or more different supported 3D image formats. For instance, the 3D model may be defined as a point cloud with points that are distributed in a 3D space to create the shape and coloring of a represented 3D object. Each point may be defined with positional elements for the position of the point in the 3D space, and non-positional elements for the coloring and/or visual characteristics of that point in the 3D space. In this instance, the 3D model constructs that are subject to compression are the point cloud points. The 3D model may also be defined as a mesh model. The constructs of the mesh model include triangles, polygons, or other meshes that are connected at different angles to create the shape or form of the represented 3D object. In this instance, the 3D model constructs that are subject to compression are the triangles, polygons, or other meshes.

Compression system 100 analyzes (at 104) different sets of constructs of the 3D model to determine if they match by a threshold amount to compressible shapes. A compressible shape is one that may be represented or created with a mathematical formula, expression, or function. In some embodiments, compression system 100 uses one or more artificial intelligence and/or machine learning ("AI/ML") techniques to define the shapes with which to compress the 3D model, and/or to analyze the sets of constructs for similarity to the shapes.

The analysis (at 104) may include selecting sets of constructs that are connected or neighbor one another in the 3D model, that are defined with positional values forming a pattern or structure, and/or that have visual commonality. More specifically, the analysis (at 104) may include analyzing the positioning and/or coloring of the 3D model constructs to detect continuous surfaces, and to compare the contours, curvature, pattern, and/or shape of the continuous surfaces against the compressible shapes.

Compression system 100 detects (at 106) a set of constructs from the 3D model that match a compressible shape by a threshold amount. For instance, the set of constructs may have positions that deviate by no more than a certain percentage from the compressible shape but that align or follow the overall form of the compressible shape.

Compression system 100 compresses (at 108) the set of constructs by replacing the data that is defined for each construct for the set of constructs with a function that recreates the compressible shape. The function may include a mathematical formula or expression that creates a curve or other form of the compressible shape in the size of the region spanned by the set of constructs in the 3D model. For instance, a set of constructs that form a spherical shape may be represented by the function $x^2+y^2+z^2=r^2$, wherein r is the sphere radius. Compression system 100 associates the function to the set of constructs or to the region of space within the 3D model that is spanned by the set of constructs so that when the function is executed, the function generates the compressible shape or constructs according to the compressible shape in the same positions or same region of space as spanned by the set of constructs.

Compressing (at 108) the set of constructs may further include defining a noise pattern that introduces variety and/or creates a deviation from the compressible shape created by the function. For instance, the function may create the compressible shape that is perfectly smooth, but the set of constructs represented by that compressible shape may not be perfectly smooth even though they follow the overall curvature of the compressible shape. The set of constructs may have positional values that create dips and valleys, roughness, a non-uniform texture, and/or other differences from the perfectly smooth shape created by the function. The noise pattern is defined to introduce the variation or as much of the variation across the shape that is created by the function. The noise pattern function may specify offsets or some sort of distribution for the constructs or the shape that are generated by the function.

Compressing (at 108) the set of constructs may further include defining a color gradient or gradient pattern to associate with the function. The gradient pattern maps the colors and/or visual characteristics of the set of constructs into a texture or function that can be applied to the constructs or shape generated by the function in order to match or recreate the coloring of the set of constructs over the generated constructs or shape.

Compression system 100 generates (at 110) the compressed 3D model to include the function, noise pattern, and/or gradient pattern in place of the set of constructs. Other sets of constructs from the 3D model that match to other compressible shapes may similarly be replaced within the compressed 3D model. The compressed 3D model may also be defined with positional and non-positional values for constructs that did not form any compressible shapes and/or were not replaced with a function.

Compression system 100 streams (at 112) the compressed 3D model instead of the uncompressed constructs of the original 3D model to a recipient device in response to the recipient device issuing a request to access the 3D model. Streaming (at 112) the compressed 3D model includes transmitting data packets over a data network from compression system 100 to the recipient device using a network streaming protocol or other protocol (e.g., HyperText Transfer Protocol). The data packets encode uncompressed constructs of the mesh model and the one or more functions, noise patterns, and/or gradient patterns for recreating the compressible shapes formed by the set of constructs and other compressed sets of constructs.

Compression system 100 may use AI/ML techniques that perform supervised or unsupervised machine learning to define the compressible shapes and/or to detect the sets of constructs in the 3D models that may be represented by a function. The supervised machine learning involves training a neural network with specific shapes that are associated with and/or generated by specific functions. The supervised machine learning determines the unique differentiating characteristics of each shape, and generates a model with connected synapses that represent each of the unique differentiating characteristics for a particular shape. The model may then be used to detects a set of constructs that collectively contain the unique differentiating characteristics of the particular shape and to compress and/or replace that set of constructs with the associated function. The unsupervised machine learning involves using the neural network to detect commonality amongst different sets of constructs that may represent compressible shapes. The unsupervised machine learning involves scanning the constructs of an inputted 3D model for patterns or commonality that differentiates one set of constructs from other sets of constructs and that likely represent a continuous surface within the 3D model that may be subject to compression. The unsupervised machine learning derives a function for representing that continuous surface from various points-of-reference about the continuous surfaces.

Figure 2:
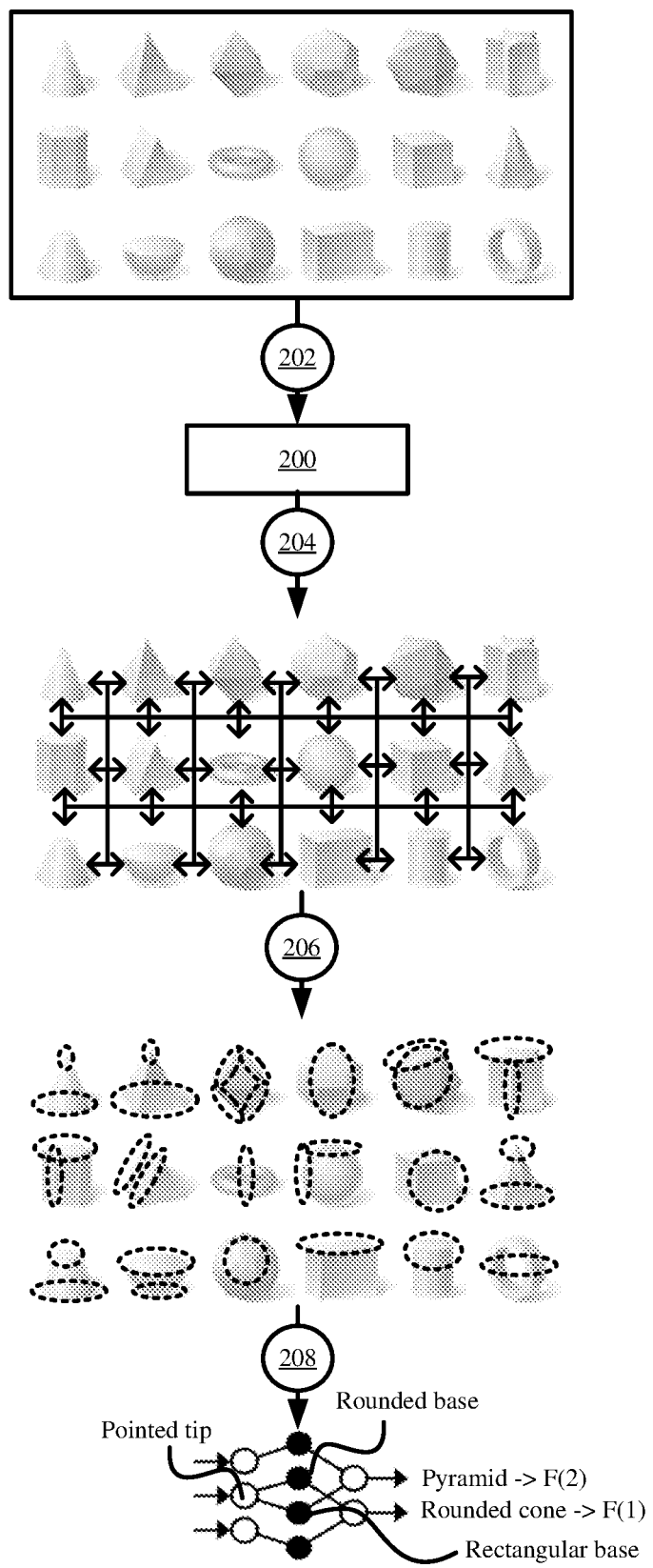
FIG. 2 illustrates an example of performing supervised machine learning for the definition and detection of compressible shapes in accordance with some embodiments presented herein.

FIG. 2 illustrates an example of performing supervised machine learning for the definition and detection of compressible shapes in accordance with some embodiments presented herein. The training data consists of predefined shapes that are each associated with a function for creating the corresponding predefined shape. The predefined shapes include whole or solid shapes as well as partial shapes such as curves. The training data is provided (at 202) as input to one or more neural networks 200.

Neural networks 200 compare (at 204) the predefined shapes to one another, and determine (at 206) one or more unique differentiating characteristics associated with each predefined shape. A unique differentiating characteristic is one aspect, element, or feature that is repeatedly found in different examples of the same predefined shape and that is not found or present in other predefined shapes. For instance, a unique differentiating characteristic may include a slope or angle with which one part or section of a surface changes in one predefined shape but not in other predefined shapes. In some embodiments, the uniqueness of the predefined shape is determined from two or more aspects, elements, or features that in combination are unique to the predefined shape, and with the unique combination of differentiating characteristics being absent in the other predefined shapes. The unique differentiating characteristics may correspond to the overall curvature of each predefined shape, different textures or patterns at different parts of each predefined shape, different coloring or coloring shifts at different parts of each predefined shape, and/or other unique structures, patterns, or commonality detected within each predefined shape.

Neural networks 200 generate (at 208) a shape detection model based on the determined (at 206) unique differentiating characteristics of each predefined shape. The unique differentiating characteristics of a particular predefined shape are defined as a connected set of synapses that collectively identify that particular predefined shape and that link to the function for defining or creating that particular predefined shape.

Each synapse or unique differentiating characteristic may be associated with a weight value. The weight value may be defined based on the frequency with which the associated unique differentiating characteristic is present in each example of a particular predefined shape and the degree with which that unique differentiating characteristic differs from characteristics of other shapes. In other words, the weight value quantifies the importance or impact that each unique differentiating characteristic has to the detection of a particular predefined shape.

The connected set of synapses for identifying a particular predefined shape may also include other characteristics of that particular predefined shape that may be shared with other predefined shapes but that are nevertheless used to identify the particular predefined shape. For instance, a first connected set of synapses for identifying a first shape may commence with one or more synapses that track the beginning characteristics (e.g., curvature, width, angle, coloring, etc.) of that first shape even though a second connected set of synapses for identifying a second shape may commence with or contain the same one or more synapses. These shared synapses or characteristics may define the start of the first and second shapes but not the end or other parts of each shape. Accordingly, the first connected set of synapses may include other synapses for other unique differentiating characteristics that are not in the second connected set of synapses and that differentiate the remainder of the first shape from the remainder of the second shape.

Compression system 100 may use the shape detection model to identify sets of constructs within a 3D model that represent one of the predefined shapes, and to compress those sets of constructs with the function that is associated with the identified predefined shape in the shape detection model. For instance, compression system 100 may compare positioning and/or coloring of one or more related or neighboring constructs in a 3D model to the synapses or characteristics for the different predefined shapes, and may continue towards the identification of a particular predefined shape with other neighboring constructs when the starting synapses or characteristics of that particular predefined shape are satisfied.

The supervised machine learning techniques for shape detection may compress more data from a 3D model than unsupervised machine learning techniques for shape detection when the same known shapes are used repeatedly throughout the 3D model or when the 3D model has similar shapes to those used to perform the supervised training of the shape detection model. For instance, the supervised shape detection provides optimal compression when the 3D model being compressed involves the same or similar objects as those used to train the supervised shape detection, and may provide lesser compression when the 3D model being compressed is of an entirely different class of objects than those used to train the supervised shape detection.

In some other embodiments, the unsupervised machine learning techniques for shape detection may yield greater 3D image data compression than the supervised machine learning techniques for shape detection. For instance, the compression may be applied to different 3D models that have a variety of non-repeating shapes, are created by different artists or design teams, or represent different and unrelated objects. Moreover, the unsupervised machine learning techniques are not restricted to compression of the predefined shapes used to train the supervised machine learning techniques, and may be trained to detect and compress new, dynamic, and/or complex shapes that differ from the predefined shapes or the shapes that are available for the supervised machine learning.

Figure 3:
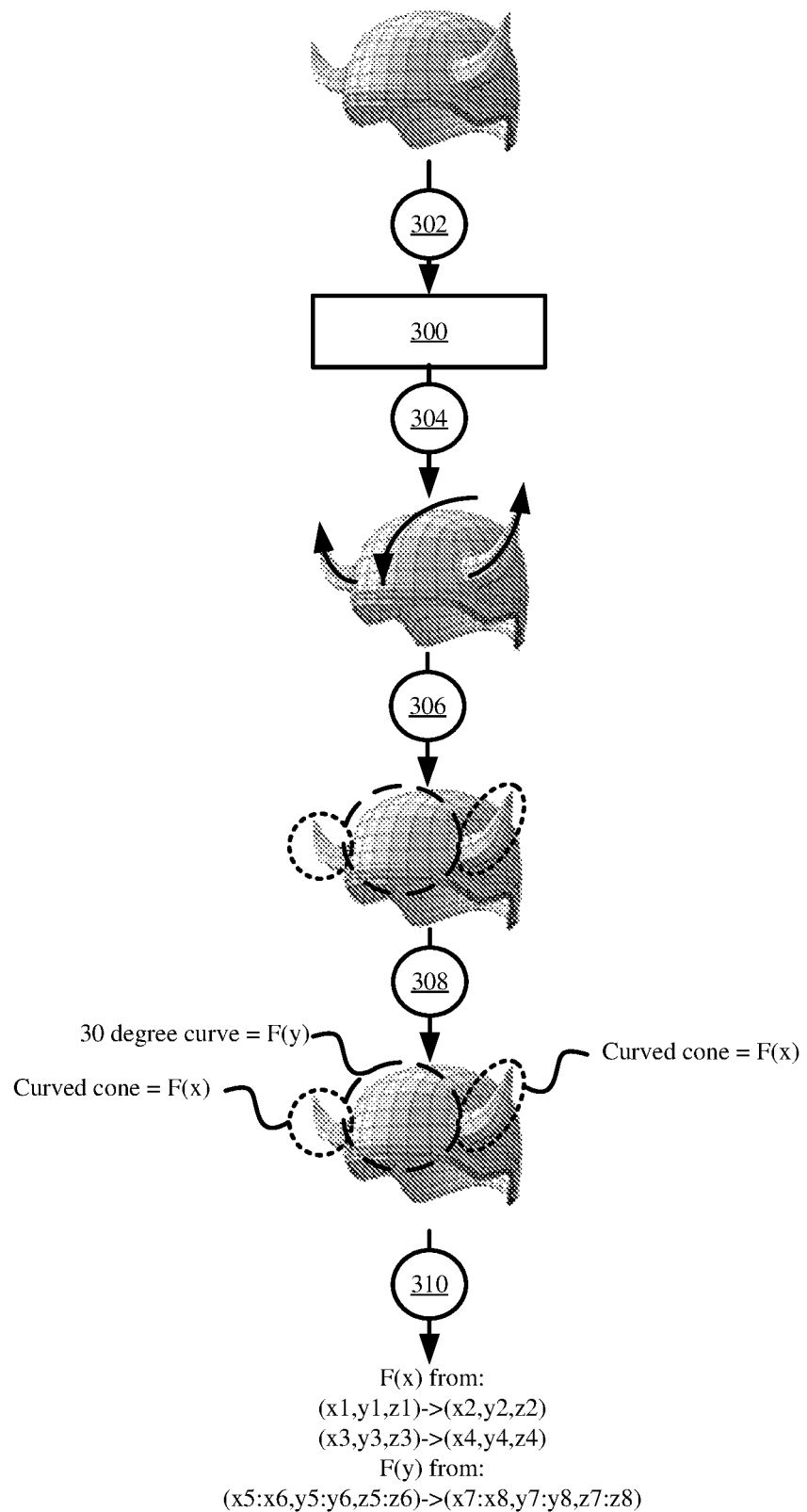
FIG. 3 illustrates an example of performing unsupervised machine learning for the definition and detection of compressible shapes in accordance with some embodiments presented herein.

FIG. 3 illustrates an example of performing unsupervised machine learning for the definition and detection of compressible shapes in accordance with some embodiments presented herein. The data for the unsupervised machine learning includes a point cloud, mesh model, or other 3D model with points, meshes, and/or other constructs that form different shapes but are not labeled or classified with identifiers differentiating the shapes from other constructs of the 3D model. The input data is provided (at 302) to one or more neural networks 300 that implement one or more unsupervised AI/ML techniques.

Neural networks 300 analyze (at 304) the positional and non-positional data of the constructs from the inputted 3D model for commonality. Constructs with structural commonality may include neighboring constructs that are positioned with a repeating pattern. For instance, constructs that create a repeating lattice structure or that have a repeating set of positional offsets may be determined to have structural commonality. Constructs with structural commonality may also include constructs that have the same surface normals or gradually changing surface normals (e.g., surface normal that do not change by more than 10% from the surface normal of a neighboring construct), and/or constructs that are positioned about a common plane, that do not form any hard edges, or that form a continuous surface by having positional offsets in a common direction. Constructs with color commonality may include neighboring constructs that have the same color values or a gradual shift in color values that does not exceed a threshold (e.g., color values of neighboring constructs changes by less than 10%). The analysis (at 304) may include identifying continuous surfaces or shapes in the 3D model based on structural commonality, color commonality, or both.

Neural networks 300 select (at 306) a set of constructs from the 3D model that form a continuous surface or shape based on detected structural/positional commonality and/or color commonality amongst the set of constructs. Selecting (at 306) the set of constructs may also include modeling a representation for the surface or shape formed by the set of constructs. For instance, neural networks 300 may draw a curve that tracks the shape formed by the set of constructs.

Neural networks 300 determine (at 308) an expression that recreates the curve or shape of the set of constructs with a threshold amount of deviation. In some embodiments, neural networks 300 may be configured with equations for different curves or shapes, and may tune the equation parameters or variables to achieve a best-fit curve that aligns with the shape formed by the set of constructs. If an equation cannot be defined that tracks the curvature of the set of constructs to within a threshold degree of accuracy, neural networks 300 may unselect the set of constructs and leave them uncompressed or revise the selection by adding or removing constructs from the set until the equation mirrors the modified shape or another equation for another shape applies.

Neural networks 300 output (at 310) the expression or equation, that approximates the shape of the set of constructs to within a threshold degree of accuracy. The expression or equation may be associated with one or more indices or identifiers. The indices or identifiers identify the set of constructs that are replaced by the expression or equation, or a position in the 3D model for the shape that is created by the expression or equation.

In some embodiments, neural networks 300 may also be used to perform a noise analysis (e.g., Gaussian or Perlin) and to generate a noise pattern for the identified noise. The noise analysis may be directed or expected, and may result in an additional function output from neural networks 300 for representing or expressing the noise pattern. For instance, neural networks 300 may model the noise distribution across a set of constructs that are represented with a function, and may compare the noise distribution to different noise models that are each associated with different functions or noise patterns. Neural network 300 may then select the function or noise pattern that most closely models the nose distribution of the set of constructs. In some other embodiments, neural networks 300 may start with a Gaussian, Perlin, or other noise distribution pattern, and may adjust parameters of the noise pattern to find the noise distribution with the adjusted parameters that most closely resembles or recreates the noise distribution of the set of constructs.

Figure 4:
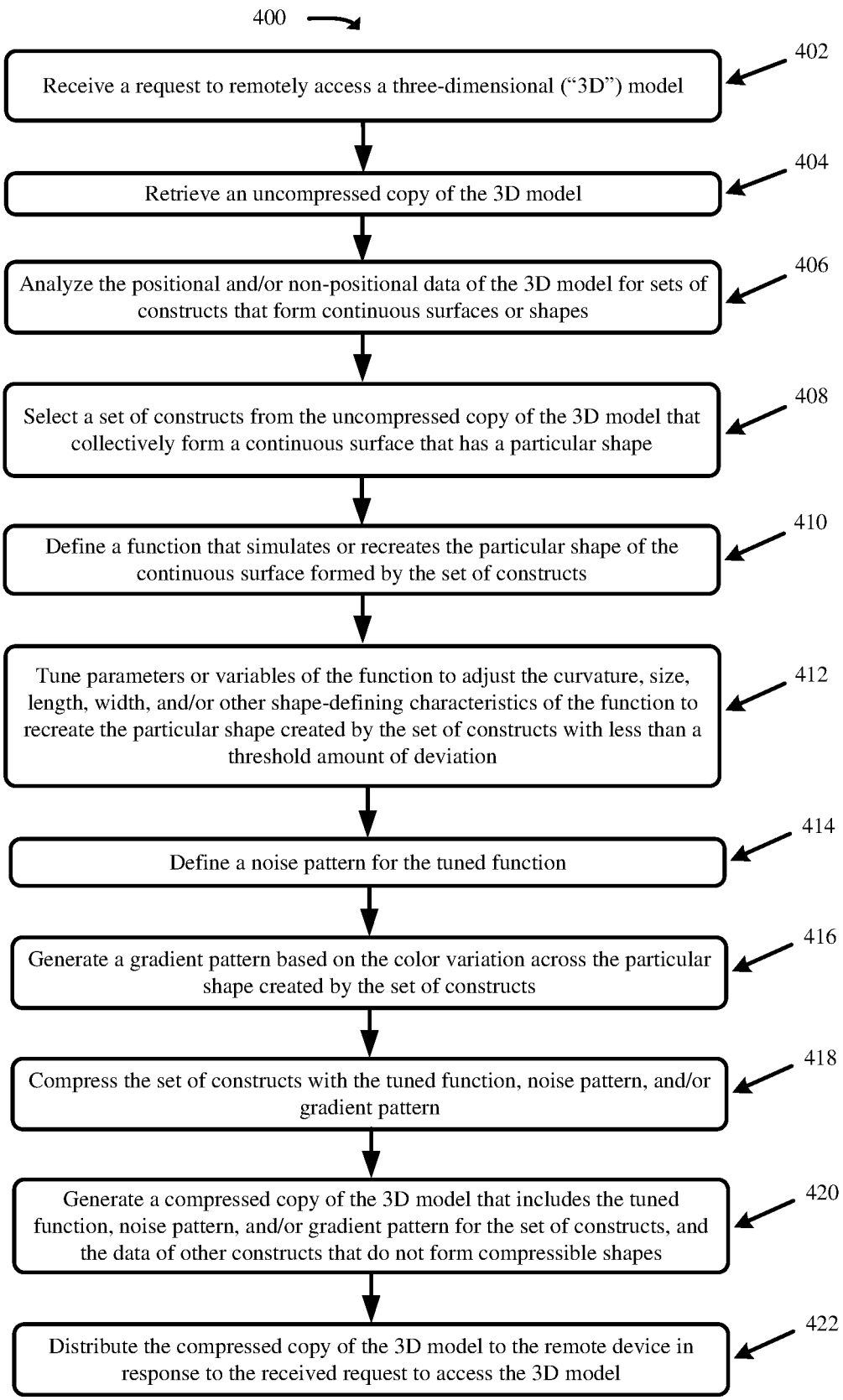
FIG. 4 presents a process for selectively compressing data from a 3D model in accordance with some embodiments presented herein.

Compression system 100 may use either the supervised or unsupervised shape detection to selectively compress data within a 3D model. FIG. 4 presents a process 400 for selectively compressing data from a 3D model in accordance with some embodiments presented herein.

Process 400 is implemented by compression system 100. Compression system 100 includes one or more devices with processor, memory, storage, network, and/or hardware resources for the compression and/or decompression of 3D models. In some embodiments, compression system 100 is part of a device or application that generates, distributes, edits, renders, and/or otherwise interacts with 3D models including point clouds, mesh models, and/or other 3D formats.

Process 400 includes receiving (at 402) a request to remotely access a 3D model. The request may be issued as a data packet from a remote device to a source device that runs compression system 100. For The request may be a HyperText Transfer Protocol ("HTTP") GET request or a request message of another network protocol that includes an identifier for the 3D model. The identifier may be a Uniform Resource Locator ("URL"), directly path, filename, or other value by which the 3D model is identified by compression system 100.

Process 400 includes retrieving (at 404) an uncompressed copy of the 3D model. The uncompressed copy includes the data for each construct of the 3D model in an uncompressed format. For instance, an uncompressed point cloud may include data for each of the points that form the point cloud model with each point being defined with positional values and non-positional values. In some embodiments, the uncompressed copy of the 3D model may be defined using a tree-based representation. For instance, the 3D model data may be organized to an octree, K-dimensional ("KD") tree, binary tree, or other tree structure in which the root node represents the entire space spanned the 3D model, each child node at a layer further removed from the root node represents a smaller subdivided smaller region of the space, and the leaf nodes correspond to the individual constructs of the 3D model.

Process 400 includes analyzing (at 406) the positional and/or non-positional data of the 3D model for sets of constructs that form continuous surfaces or shapes that may be subject to compression. For instance, compression system 100 may use the supervised machine learning technique to define and detect predefined shapes and to identify sets of constructs that match one or more of the predefined shapes, or may use unsupervised machine learning to detect shapes based on structural and/or color commonality.

Process 400 includes selecting (at 408) a set of constructs from the uncompressed copy of the 3D model that collectively form a continuous surface that has a particular shape. Selecting (at 408) the set of constructs may include selecting the individual constructs within the set of constructs, tagging the set of constructs to differentiate them from other constructs, and/or selecting nodes from a tree-based representation of the 3D model that correspond to the set of constructs. Selecting (at 408) the set of constructs may also include obtaining the data associated with each construct of the set of constructs.

Process 400 includes defining (at 410) a function that simulates or recreates the particular shape of the continuous surface formed by the set of constructs. In some embodiments, defining (at 410) the function may include selecting the formula or expression that is associated with a predefined shape from a supervised machine learning shape detection model that matches or is similar to the particular shape formed by the set of constructs. In some embodiments, defining (at 410) the function may include determining a formula or expression that approximates the particular shape formed by the set of constructs.

Process 400 includes tuning (at 412) parameters or variables of the function to adjust the curvature, size, length, width, and/or other shape-defining characteristics of the function to recreate the particular shape created by the set of constructs with less than a threshold amount of deviation. For instance, a quadratic equation such as ($ax^2+bx+c$) may represent the function for drawing various curves or shapes, and tuning (at 412) the parameters includes setting one or more of the a, b, c, and/or x parameters to control the curvature or shape that is produced. The same tuning may be applied to polar equations, parameterized equations, trigonometric functions, parabolic equations, and/or other expressions for mathematically generating curves or other shapes.

The tuning (at 412) may include comparing the particular shape that is formed by the set of constructs to different shapes that are created by the function with different tuned parameters. Compression system 100 selects the tuning parameters for the defined function that recreate the particular shape with the least amount of deviation.

Process 400 includes defining (at 414) a noise pattern for the tuned function. The tuned function generates a smooth curve or a shape with smooth or flat surfaces. The noise pattern introduces noise over the generated curve or shape. The noise adds a roughness, texture, and/or variance across the generated curve or shape. More specifically, the noise introduces non-uniformity across the smooth or flat surface generated by the tuned function. Accordingly, the noise pattern adjusts the curve or shape generated by the tuned function to better match the variance or non-uniformity that occurs across the particular shape created by the set of constructs or the variability in the distribution of the set of constructs.

In some embodiments, compression system 100 computes an amount or pattern by which the distribution of the set of constructs deviate from the curve or shape generated by the tuned function, and defines (at 414) the noise pattern based on the deviation. In some embodiments, the noise pattern may introduce noise according to a Gaussian or Perlin distribution. In some such embodiments, compression system 100 determines which distribution best approximates the variation within the set of constructs and tunes the distribution to more closely match the detected variation. In some embodiments, the noise pattern is a formula or expression that is applied directly to the tuned function or that is applied to the curve or shape that is generated from the tuned function.

Process 400 includes generating (at 416) a gradient pattern based on the color variation across the particular shape created by the set of constructs. In some embodiments, compression system 100 analyzes the color distribution across the particular shape and/or the color values defined for the set of constructs from one end of the particular shape to the other end, and defines a gradient pattern that recreates that color distribution and/or the coloring from one end of the particular shape to the other end. The gradient pattern may be defined as a mathematical expression or formula, or as a texture that may be applied to a curve or shape generated by the tuned function and/or noise pattern.

Process 400 includes compressing (at 418) the set of constructs with the tuned function, noise pattern, and/or gradient pattern. Compressing (at 418) the set of constructs includes replacing the data for each construct of the set of constructs in the uncompressed copy of the 3D model with the tuned function, noise pattern, and/or gradient pattern. Compressing (at 418) the set of constructs may further include associating a region or position at which to apply the tuned function or the shape that is generated by the tuned function. For instance, the tuned function may be defined to a create a shape with a similar size (e.g., length, width, etc.) as the particular shape formed by the set of constructs, and may be further defined with positional offsets to place the created shape in the same position in the 3D model as the particular shaped formed by the set of constructs. In some embodiments, the maximum and minimum or boundary positional values associated with the set of constructs may be associated with the tuned function so that the created shape is correctly positioned in place of the particular shape formed by the set of constructs in the compressed 3D model.

A function, noise pattern, and/or gradient pattern may be defined and used to compress other sets of constructs from the 3D model that form other compressible shapes that may be represented by the defined function. However, some constructs do not form compressible shapes or shapes that may be represented mathematically.

Process 400 includes generating (at 420) a compressed copy of the 3D model that includes the tuned function, noise pattern, and/or gradient pattern for the set of constructs, and the data of other constructs that do not form compressible shapes. In some embodiments, other compression techniques may be applied to achieve a reduction in the amount of data that is stored for the other constructs that do not form compressible shapes. For instance, Draco compression may be used to perform an alternative compression of the other constructs in the 3D model that do not form compressible shapes.

Process 400 includes distributing (at 422) the compressed copy of the 3D model to the remote device in response to the received request to access the 3D model. Distributing (at 422) the compressed copy includes streaming the compressed data instead of the uncompressed data of the 3D model to the remote device. Specifically, the data for the set of constructs that form the compressible shape is replaced in the 3D model with the tuned function, noise pattern, and gradient pattern. The definition of the tuned function, noise pattern, and gradient pattern require significantly less data than the cumulative data of the set of constructs. In some embodiments, the 3D model may be compressed prior to receiving (at 402) the request to access the 3D model so that the compressed copy of the 3D model may be immediately distributed to the remote device without delays associated with compressing the 3D model.

In some embodiments, compression system 100 maximizes the number of constructs that are compressed and/or replaced in the compressed copy of the 3D model with functions by decomposing a set of constructs that do not form a compressible shape and cannot be expressed with a single function into subsets of constructs that have less positional variation and that represent simpler shapes than the overall shape formed by the set of constructs. Compression system 100 then compresses each subset of constructs with a separate function, noise pattern, and/or gradient pattern that recreates the simpler shape of each subset of constructs. In particular, compression system 100 may decompose the set of constructs into planes that may be defined as functions.

Figure 5:
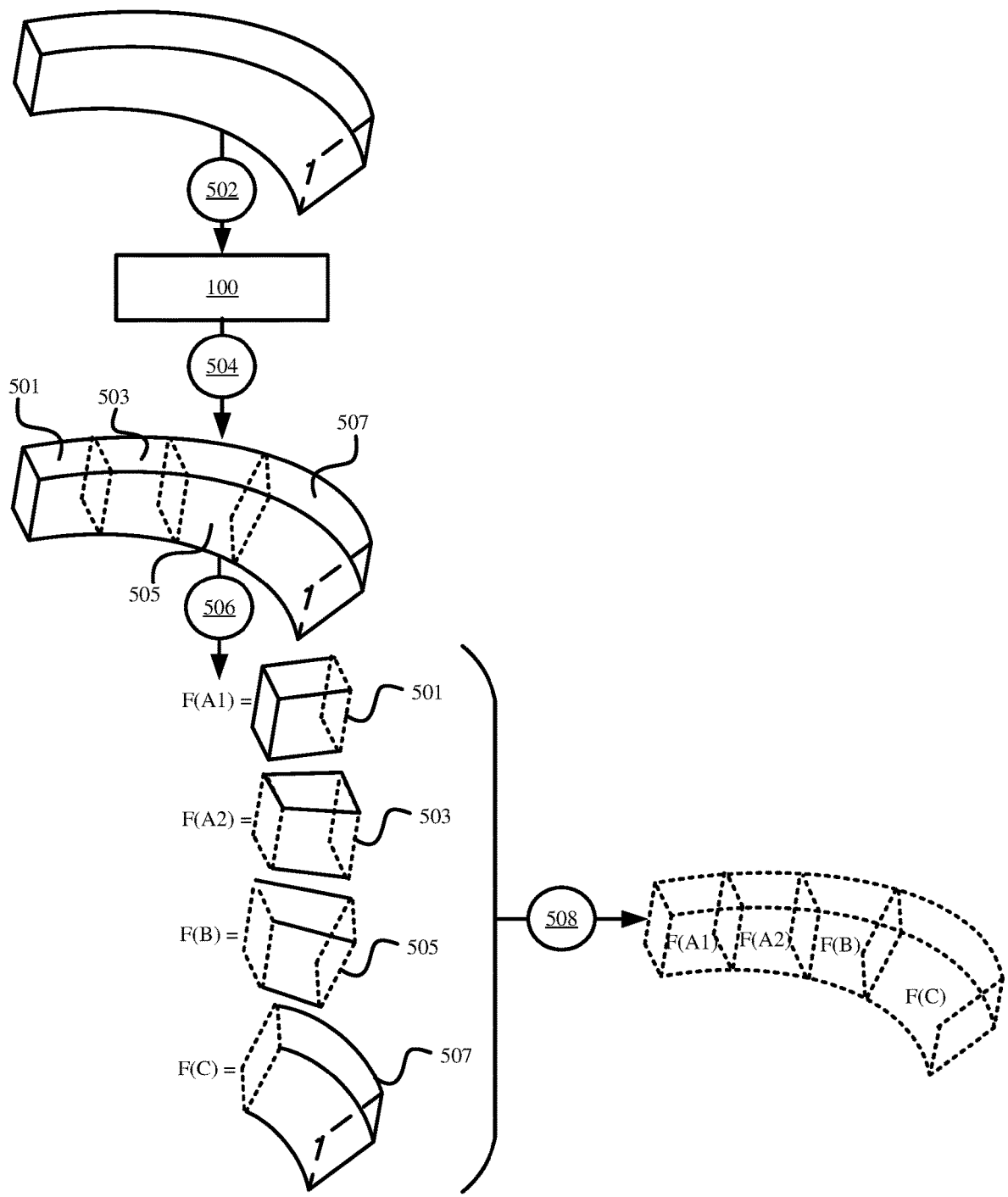
FIG. 5 illustrates an example of decomposing a complex shape formed by a set of constructs into simple shapes for compression in accordance with some embodiments presented herein.

FIG. 5 illustrates an example of decomposing a complex shape formed by a set of constructs into simple shapes for compression in accordance with some embodiments presented herein. Compression system 100 selects (at 502) the set of constructs based on positional and/or color commonality amongst the set of constructs or in response to determining that the set of constructs represent a continuous surface of a 3D model.

Compression system 100 determines that no available function approximates the shape formed by the set of constructs to within a threshold degree of accuracy. Accordingly, compression system 100 decomposes (at 504) the shape formed by the set of constructs into simpler shapes or planes. For instance, a complex shape with varying curvature may initially be decomposed into smaller shapes that each have a simple curve, and may then be decomposed further into planes. The combination of planes when combined form each of the curves. In some embodiments, compression system 100 decomposes the complex shape into similar smaller shapes or planes that can be represented with the same parametrized equation. Decomposing (at 504) the shape includes selecting the subset of constructs that form or are within each of the smaller shapes or planes. In this example, compression system 100 decomposes (at 504) the complex shape represented by the set of constructs into first cube 501 that is represented by a first subset of the set of constructs, second cube 503 that is represented by a second subset of the set of constructs, trapezoidal prism 505 that is represented by a second subset of the set of constructs, and 3D curve 507 that is represented by a fourth subset of the set of constructs, Compression system 100 defines (at 506) a function that represents the smaller shape or plane formed by each subset of constructs. Accordingly, the complex shape formed by the set of constructs is compressed and/or represented by a set of two or more functions that collectively recreate different parts of the complex shape. If the complex shape is decomposed (at 504) into even smaller shapes or planes that can be represented with the same parameterized equation, defining (at 506) the function includes tuning the function parameters to create the variations in each of the decomposed shapes or planes. For instance, compression system 100 defines first cube 501 using a first function with a first set of tuning parameters, defines second cube 503 using the first function with a second set of tuning parameters, defines trapezoidal prism 505 using a second function with a set of tuning parameters, and defines 3D curve 507 using a third function with a set of tuning parameters.

Compression system 100 compresses (at 508) the 3D model by replacing the set of constructs with the set of tuned functions that collectively recreate the complex shape formed by the set of constructs with smaller and more simple shapes that are combined. Compressing (at 508) the 3D model further includes defining a noise pattern for all or each of the set of functions and a gradient pattern to recreate the color of the complex shape across the smaller shapes or planes.

Rather than decompose a complex shape into smaller shapes or planes, compression system 100 may select sets of constructs within the 3D model that form the smaller shapes or planes and that can be represented with a known function. For instance, compression system 100 selects a set of neighboring constructs that are positioned about the same plane or z-depth, and defines a function to represent that plane rather than add constructs for a continuous surface to the set of constructs and increase the complexity of the shape that is to be compressed and represented with a function.

Figure 6:
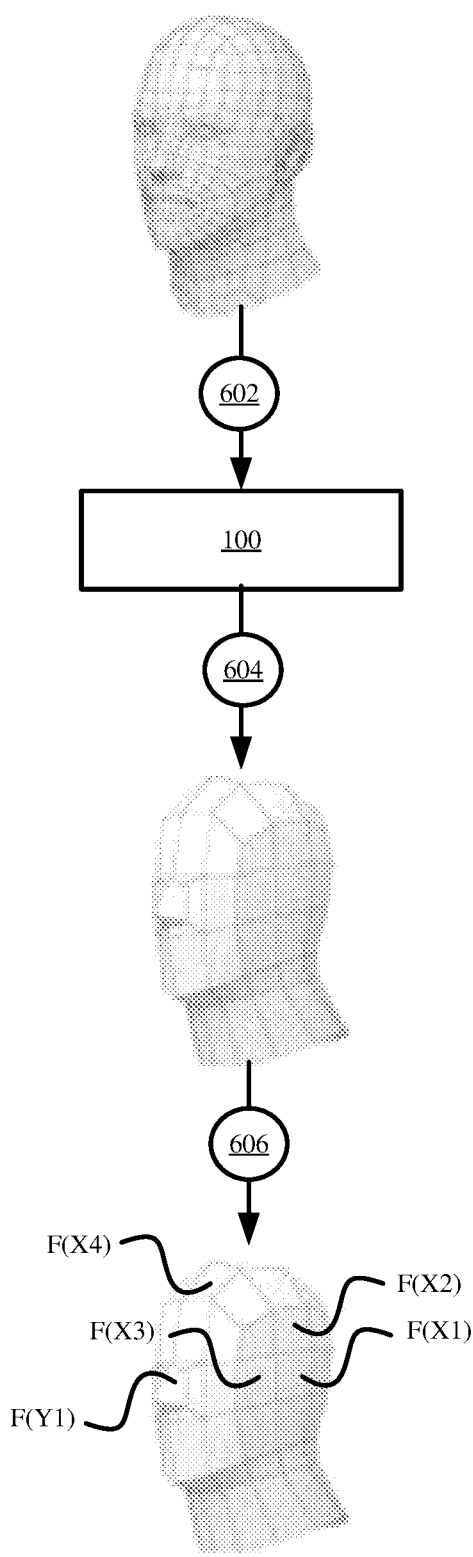
FIG. 6 illustrates an example of compressing a 3D model based on a dynamic selection of constructs that form compressible shapes in accordance with some embodiments presented herein.

FIG. 6 illustrates an example of compressing a 3D model based on a dynamic selection of constructs that form compressible shapes in accordance with some embodiments presented herein. Compression system 100 receives (at 602) a set of constructs that are part of a continuous surface of a 3D model and that form a complex shape in the 3D model.

In this method of operation, compression system 100 does not select the set of constructs for compression and does not decompose the set of constructs into simpler shapes. Instead, compression system 100 selects (at 604) an uncompressed construct and dynamically expands (at 604) the selection to include neighboring constructs until a compressible shape that may be represented with a function is formed by a subset of dynamically selected constructs. For instance, FIG. 6 illustrates compression system 100 selecting subsets of the set of constructs that form rectangular planes that are easily represented with different tuning of the same function or with different functions.

Compression system 100 compresses (at 606) each subset of constructs that form a compressible shape with the function that recreates that compressible shape. Compression system 100 may generate the compressed 3D model based on the defined functions with each function creating a part of the 3D model that is represented by a different subset of the set of constructs that collectively form the complex shape of the original 3D model.

The compressed 3D model may be encoded as a tree-based representation. Specifically, the functions, noise patterns, and gradient patterns may be inserted into the tree-based representation at layers or nodes corresponding to the position in the 3D model where the shape defined by a function, noise pattern, and/or gradient pattern is to be located.

Figure 7:
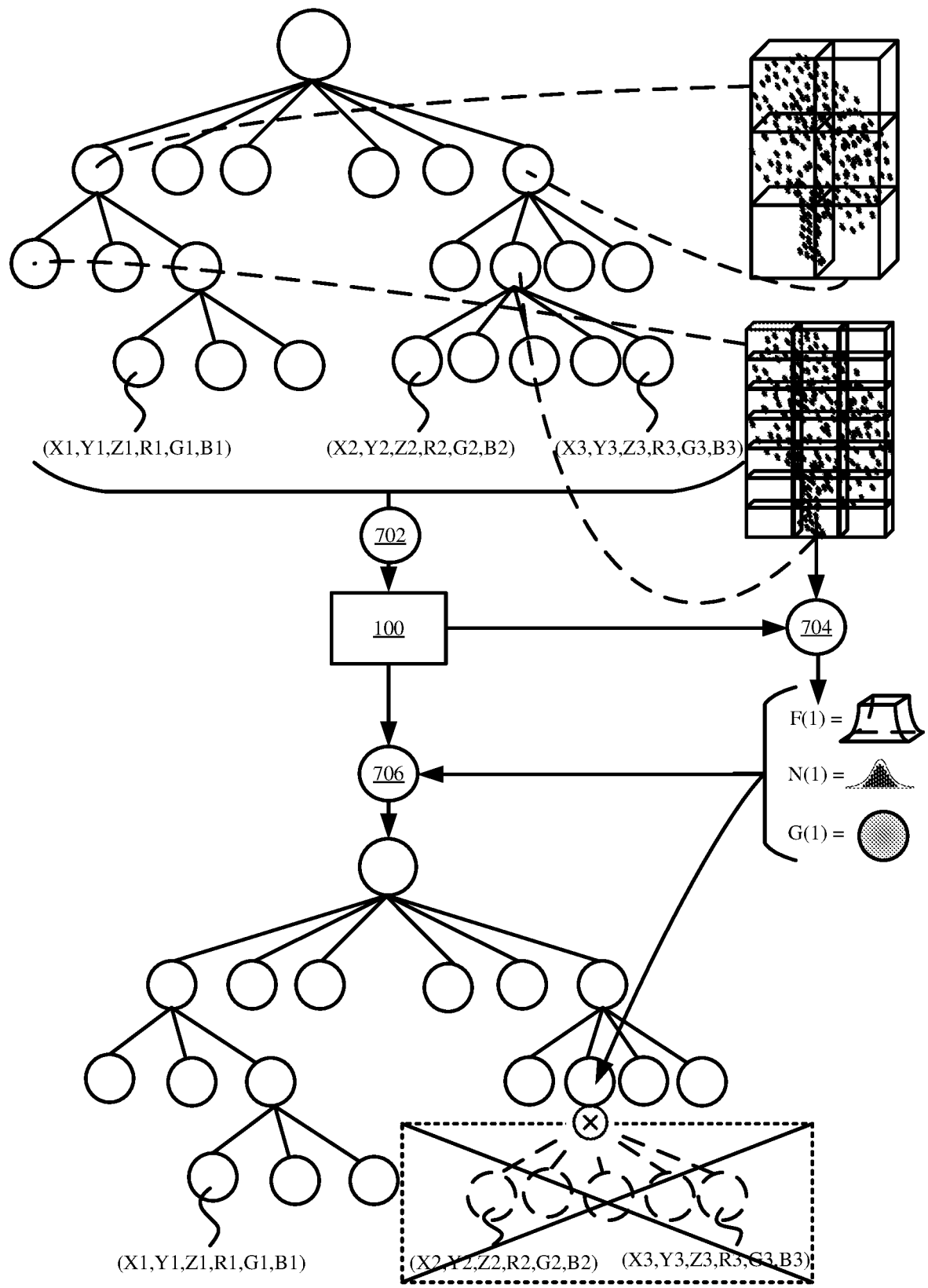
FIG. 7 illustrates an example of generating a tree-based representation for a compressed 3D model in accordance with some embodiments presented herein.

FIG. 7 illustrates an example of generating a tree-based representation for a compressed 3D model in accordance with some embodiments presented herein. Compression system 100 receives (at 702) an uncompressed 3D model that is encoded to a particular tree-based representation. For instance, the uncompressed 3D model may be encoded as an octree, KD tree, binary tree, or another tree structure.

The particular tree-based representation is defined with nodes at different layers that correspond to different sized regions of the uncompressed 3D model and with leaf nodes that correspond to each construct of the uncompressed 3D model. A leaf node therefore stores the positional and non-positional data for a particular construct of the uncompressed 3D model. A parent node that is linked to two or more of the leaf nodes represents the region of the uncompressed 3D model that encompasses the two or more constructs associated with the two or more leaf nodes that are linked to that parent node.

Compression system 100 defines (at 704) a function that represents a shape formed by a set of constructs in a particular region of the uncompressed 3D model. Compression system 100 may also define (at 704) the noise pattern and gradient pattern for the variance and coloring of the set of constructs.

Compression system 100 identifies the highest level node or layer within the tree-based representation that links to the leaf nodes for that set of constructs, and replaces (at 706) that branch of the tree-based representation with a node that links to the function, noise pattern, and/or gradient pattern rather than the leaf nodes storing the data for each construct of the set of constructs. Accordingly, the replaced node is associated with the particular region of the 3D model that contained the shape represented by the set of constructs prior to the compression, and is associated with the function that creates the shape in the same region after the compression.

Figure 8:
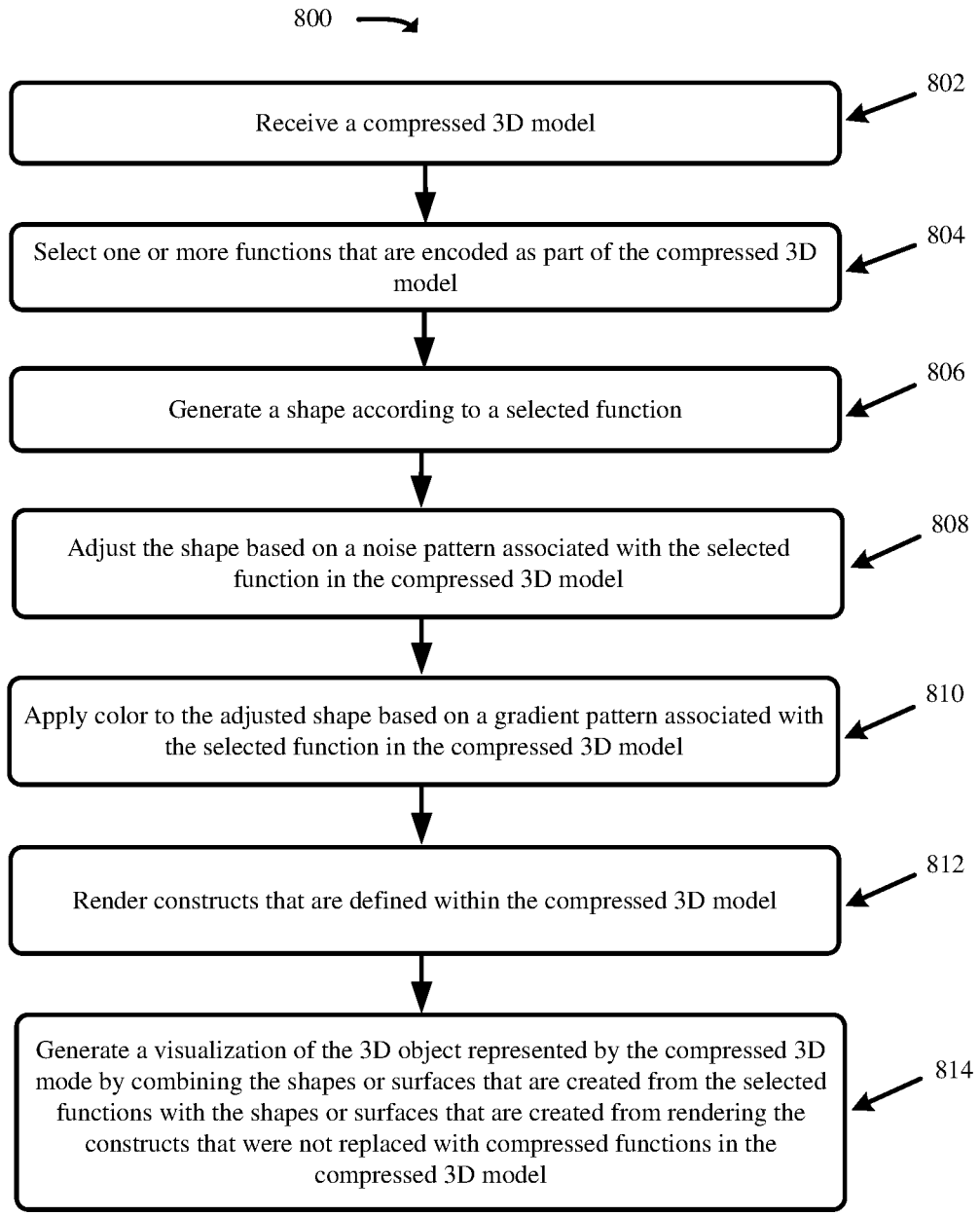
FIG. 8 presents a process for decompressing a compressed 3D model in accordance with some embodiments presented herein.

FIG. 8 presents a process 800 for decompressing a compressed 3D model in accordance with some embodiments presented herein. Process 800 is implemented by compression system 100 when compression system 100 performs the compressed 3D model decompression.

Process 800 includes receiving (at 802) the compressed 3D model. The compressed 3D model includes a first set of data or constructs that may be rendered to form first parts or surfaces of the represented 3D object, and one or more functions, noise patterns, and/or gradient patterns for recreating the remaining parts or surfaces of the represented 3D object. The one or more functions, noise patterns, and/or gradient patterns replace or provide a compressed representation for a second set of data or constructs of the original or uncompressed 3D model.

Process 800 includes selecting (at 804) one or more functions that are encoded as part of the compressed 3D model. Each function is associated with a different region of the 3D model or the 3D object represented by the compressed 3D model. For instance, each function may be associated with positional offsets or coordinates for where the shape created by that function is to be positioned within the 3D space of the 3D model. Selecting (at 804) a particular function may include searching the compressed 3D model for the definition of the particular function, or traversing the tree-based representation of the compressed 3D model until arriving at a node that is linked to the particular function.

Process 800 includes generating (at 806) a shape according to a selected function. Generating (at 806) the shape includes creating points, meshes, or other constructs to form a shape with a size, curvature, and/or other shape characteristics defined by the selected function. Generating (at 806) the shape further includes positioning the shape in the 3D space of the 3D model according to the positional offsets or coordinates that are associated with the selected function.

Process 800 includes adjusting (at 808) the shape based on a noise pattern associated with the selected function in the compressed 3D model. Adjusting (at 808) the shape includes modifying the positioning of the constructs that are generated (at 806) using the selected function to vary according to the distribution specified by the noise pattern. The noise pattern may add desired non-uniformity across the shape to better match the original shape formed by the set of constructs replaced by the selected function. The adjustments may be approximated with a Gaussian or Perlin distribution or may defined with a customized expression that is derived from analyzing the distribution or non-uniformity associated with the set of constructs replaced by the selected function.

Process 800 includes applying (at 810) color to the adjusted shape based on a gradient pattern associated with the selected function in the compressed 3D model. The gradient pattern approximates the different colors defined for each construct of the set of constructs that formed the original shape that was replaced by the selected function, and applies the approximated coloring across the surface of the adjusted shape created by the selected function and the noise pattern. In some embodiments, the coloring of the gradient pattern is defined as an expression. In some other embodiments, the gradient pattern is a texture that is transformed and applied over the surface of the adjusted shape.

Process 800 includes rendering (at 812) constructs that are defined within the compressed 3D model and that are not represented or replaced with a function in the compressed 3D model. Rendering (at 812) the constructs includes creating a visual representation for each construct based on the positional and non-positional elements that are defined for that construct in the compressed 3D model.

Process 800 includes generating (at 814) a visualization of the 3D object represented by the compressed 3D model. Compression system 100 generates (at 814) the visualization by combining the shapes or surfaces that are created from the selected functions with the shapes or surfaces that are created from rendering (at 812) the constructs that were not replaced with compressed functions in the compressed 3D model.

Figure 9:
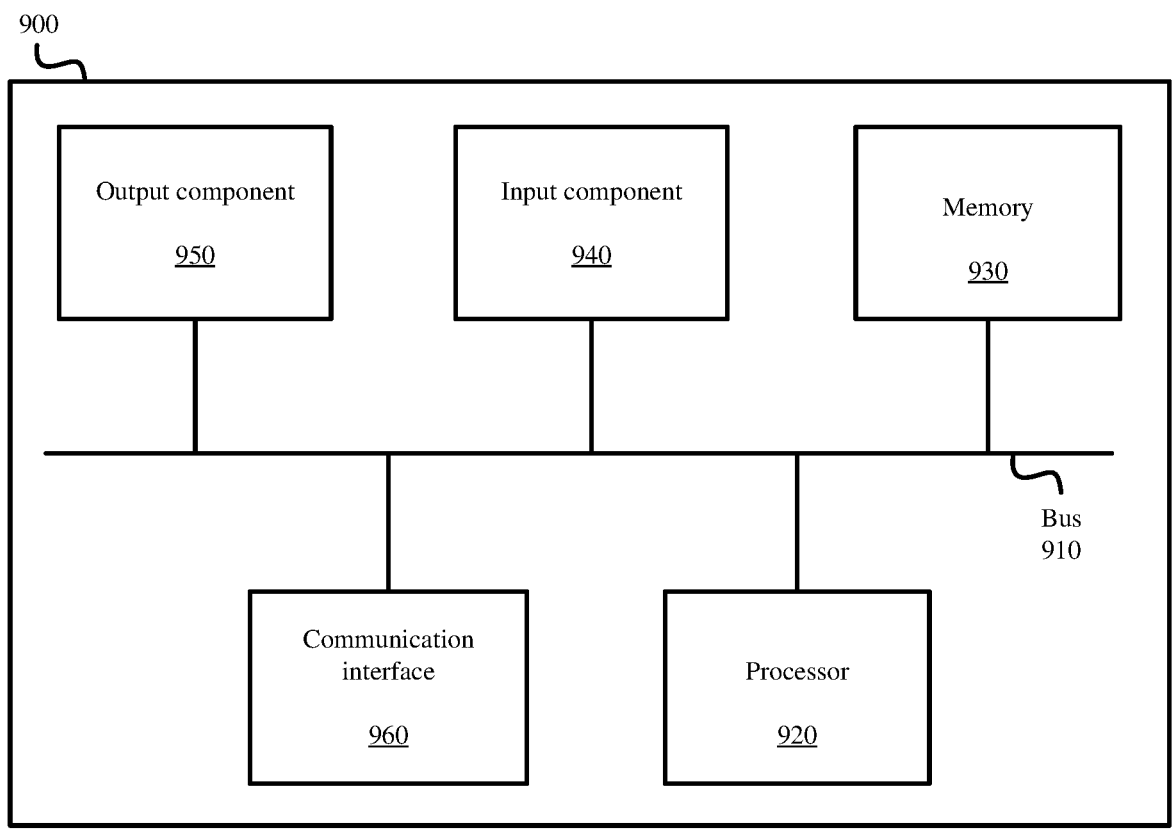
FIG. 9 illustrates example components of one or more devices, according to one or more embodiments described herein.

FIG. 9 is a diagram of example components of device 900. Device 900 may be used to implement one or more of the devices or systems described above (e.g., compression system 100). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth®radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a three-dimensional ("3D") model comprising a plurality of constructs that form different shapes of a 3D object represented by the 3D model;
   selecting a set of constructs from the plurality of constructs based on the set of constructs forming a particular shape;
   defining a function that generates an approximate shape for the particular shape formed by the set of constructs;
   determining a difference between the approximate shape that is generated by the function and the particular shape formed by the set of constructs;
   defining a noise pattern based on the difference, wherein the noise pattern introduces variance across the approximate shape that simulates a distribution of the set of constructs forming the particular shape; and
   compressing the 3D model by replacing the set of constructs with the function and the noise pattern.

2. The method of claim 1 further comprising:
   receiving a request to access the 3D model from a remote device; and
   streaming the 3D model after compression to the remote device in response to the request, wherein the 3D model after compression comprises the function and other constructs from the plurality of constructs that are not part of the set of constructs.

3. The method of claim 1 further comprising:
   analyzing color values of the set of constructs; and
   defining a gradient pattern based on the color values of the set of constructs, wherein the gradient pattern applies a color distribution across the approximate shape that is based on a color distribution for the particular shape formed by the set of constructs.

4. The method of claim 1 further comprising:
   determining a region spanned by the set of constructs in a 3D space of the 3D model based on positional values defined for two or more constructs of the set of constructs; and
   associating coordinates of the region spanned by the set of constructs to the function, wherein the coordinates specify a position for the approximate shape in the region spanned by the set of constructs.

5. The method of claim 1 further comprising:
   selecting a second set of constructs from the plurality of constructs that does not include constructs from the set of constructs, wherein the second set of constructs form a second shape that is different than the particular shape;
   defining a second function that generates the second shape formed by the second set of constructs; and
   wherein compressing the 3D model comprises replacing the second set of constructs with the second function.

6. The method of claim 1 further comprising:
   training a neural network with data representing a plurality of shapes;
   determining unique characteristics for each shape of the plurality of shapes as a result of training the neural network; and
   wherein selecting the set of constructs comprises determining that a positioning of the set of constructs matches, by a threshold amount, the unique characteristics of the particular shape.

7. The method of claim 1 further comprising:
   determining a correspondence between each function of a plurality of functions and a different shape from a plurality of shapes; and
   wherein defining the function comprises selecting a particular function from the plurality of functions that recreates the particular shape formed by the set of constructs in response to determining the correspondence between the particular function and the particular shape.

8. The method of claim 1 further comprising:
   analyzing the particular shape formed by the set of constructs;
   determining a difference between a first shape generated by the function with a first set parameters and the particular shape; and
   tuning the function based on the difference, wherein tuning the function comprises defining a second set of parameters for the function that change the first shape to a second shape that matches the particular shape more closely than the first shape.

9. The method of claim 1 further comprising:
   generating a compressed 3D model comprising data from a second set of constructs of the plurality of constructs and the function instead of the set of constructs.

10. The method of claim 1, wherein selecting the set of constructs comprises:
    selecting a first construct from the plurality of constructs;
    expanding a selection of the first construct to include one or more constructs from the plurality of constructs that neighbor the first construct; and determining that the selection of the first construct and the one or more constructs form a specific compressible shape from a plurality of compressible shapes.

11. The method of claim 10,
wherein each compressible shape of the plurality of compressible shapes is associated with a different function; and
wherein defining the function comprises selecting the different function that is associated with the specific compressible shape.

12. The method of claim 1, wherein selecting the set of constructs comprises:
decomposing the plurality of constructs into subsets of constructs that form each of the different shapes of the 3D object; and
determining that a particular subset of constructs forms the particular shape and that the particular shape corresponds to a compressible shape that is represented by the function.

13. The method of claim 1, wherein the function is an expression that formulaically represents the particular shape.

14. A compression system comprising:
one or more hardware processors configured to:
receive a three-dimensional ("3D") model comprising a plurality of constructs that form different shapes of a 3D object represented by the 3D model;
select a set of constructs from the plurality of constructs based on the set of constructs forming a particular shape;
define a function that generates an approximate shape for the particular shape formed by the set of constructs;
determine a difference between the approximate shape that is generated by the function and the particular shape formed by the set of constructs;
define a noise pattern based on the difference, wherein the noise pattern introduces variance across the approximate shape that simulates a distribution of the set of constructs forming the particular shape; and
compress the 3D model by replacing the set of constructs with the function and the noise pattern.

15. A method comprising:
receiving a three-dimensional ("3D") model comprising a plurality of constructs that form different shapes of a 3D object represented by the 3D model;
selecting a first set of constructs from the plurality of constructs based on the first set of constructs forming a first shape;
defining a first function that generates an approximate shape for the first shape formed by the first set of constructs;
selecting a second set of constructs from the plurality of constructs that does not include constructs from the first set of constructs, wherein the second set of constructs form a second shape that is different than the first shape;
defining a second function that generates the second shape formed by the second set of constructs; and
compressing the 3D model by replacing the first set of constructs with the first function and the second set of constructs with the second function.

16. A compression system comprising:
one or more hardware processors configured to:
receive a three-dimensional ("3D") model comprising a plurality of constructs that form different shapes of a 3D object represented by the 3D model;
select a first set of constructs from the plurality of constructs based on the first set of constructs forming a first shape;
define a first function that generates an approximate shape for the first shape formed by the first set of constructs;
select a second set of constructs from the plurality of constructs that does not include constructs from the first set of constructs, wherein the second set of constructs form a second shape that is different than the first shape;
define a second function that generates the second shape formed by the second set of constructs; and
compress the 3D model by replacing the first set of constructs with the first function and the second set of constructs with the second function.

17. A method comprising:
training a neural network with data representing a plurality of shapes;
determining unique characteristics for each shape of the plurality of shapes as a result of training the neural network;
receiving a three-dimensional ("3D") model comprising a plurality of constructs that form different shapes of a 3D object represented by the 3D model;
selecting a set of constructs from the plurality of constructs based on the set of constructs forming a particular shape, wherein selecting the set of constructs comprises determining that a positioning of the set of constructs matches, by a threshold amount, the unique characteristics of the particular shape;
defining a function that generates an approximate shape for the particular shape formed by the set of constructs; and
compressing the 3D model by replacing the set of constructs with the function.

18. A compression system comprising:
one or more hardware processors configured to:
train a neural network with data representing a plurality of shapes;
determine unique characteristics for each shape of the plurality of shapes as a result of training the neural network;
receive a three-dimensional ("3D") model comprising a plurality of constructs that form different shapes of a 3D object represented by the 3D model;
select a set of constructs from the plurality of constructs based on the set of constructs forming a particular shape, wherein selecting the set of constructs comprises determining that a positioning of the set of constructs matches, by a threshold amount, the unique characteristics of the particular shape;
define a function that generates an approximate shape for the particular shape formed by the set of constructs; and
compress the 3D model by replacing the set of constructs with the function.

19. A method comprising:
receiving a three-dimensional ("3D") model comprising a plurality of constructs that form different shapes of a 3D object represented by the 3D model;
selecting a set of constructs from the plurality of constructs based on the set of constructs forming a particular shape;
analyzing the particular shape formed by the set of constructs;

defining a function that generates an approximate shape for the particular shape formed by the set of constructs;

determining a difference between a first shape, that is generated by the function with a first set parameters, and the particular shape;

tuning the function based on the difference, wherein tuning the function comprises defining a second set of parameters for the function that change the first shape to a second shape that matches the particular shape more closely than the first shape; and compressing the 3D model by replacing the set of constructs with the function defined with the second set of parameters.

20. A compression system comprising:
one or more hardware processors configured to:
  receive a three-dimensional ("3D") model comprising a plurality of constructs that form different shapes of a 3D object represented by the 3D model;
  select a set of constructs from the plurality of constructs based on the set of constructs forming a particular shape;
  analyze the particular shape formed by the set of constructs;
  define a function that generates an approximate shape for the particular shape formed by the set of constructs;
  determine a difference between a first shape, that is generated by the function with a first set parameters, and the particular shape;
  tune the function based on the difference, wherein tuning the function comprises defining a second set of parameters for the function that change the first shape to a second shape that matches the particular shape more closely than the first shape; and
  compress the 3D model by replacing the set of constructs with the function defined with the second set of parameters.

21. A method comprising:
receiving a three-dimensional ("3D") model comprising a plurality of constructs that form different shapes of a 3D object represented by the 3D model;

selecting a set of constructs from the plurality of constructs based on the set of constructs forming a particular shape, wherein selecting the set of constructs comprises:
  selecting a first construct from the plurality of constructs;
  expanding a selection of the first construct to include one or more constructs from the plurality of constructs that neighbor the first construct; and
  determining that the selection of the first construct and the one or more constructs form a specific compressible shape from a plurality of compressible shapes;
defining a function that generates an approximate shape for the particular shape formed by the set of constructs; and
compressing the 3D model by replacing the set of constructs with the function.

22. A compression system comprising:
one or more hardware processors configured to:
  receive a three-dimensional ("3D") model comprising a plurality of constructs that form different shapes of a 3D object represented by the 3D model;
  select a set of constructs from the plurality of constructs based on the set of constructs forming a particular shape, wherein selecting the set of constructs comprises:
  select a first construct from the plurality of constructs;
  expand a selection of the first construct to include one or more constructs from the plurality of constructs that neighbor the first construct; and
  determine that the selection of the first construct and the one or more constructs form a specific compressible shape from a plurality of compressible shapes;
  define a function that generates an approximate shape for the particular shape formed by the set of constructs; and
  compress the 3D model by replacing the set of constructs with the function.

* * * * *